United States Patent
Takahara et al.

(10) Patent No.: US 10,608,542 B2
(45) Date of Patent: Mar. 31, 2020

(54) POWER CONVERSION DEVICE WITH OPERATION IN DUAL-LEG RESONANT MODE OR SINGLE-LEG RESONANT MODE

(71) Applicant: Mitsubishi Electric Corporation, Chiyoda-ku (JP)

(72) Inventors: Takaaki Takahara, Chiyoda-ku (JP); Hiroto Mizutani, Chiyoda-ku (JP); Hajime Toyoda, Chiyoda-ku (JP); Hiroyasu Iwabuki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/316,726

(22) PCT Filed: May 10, 2017

(86) PCT No.: PCT/JP2017/017635
§ 371 (c)(1),
(2) Date: Jan. 10, 2019

(87) PCT Pub. No.: WO2018/061286
PCT Pub. Date: Apr. 5, 2018

(65) Prior Publication Data
US 2019/0214916 A1 Jul. 11, 2019

(30) Foreign Application Priority Data
Sep. 29, 2016 (JP) ................... 2016-190569

(51) Int. Cl.
*H02M 3/335* (2006.01)
*H02M 1/08* (2006.01)
(Continued)

(52) U.S. Cl.
CPC ....... *H02M 3/33569* (2013.01); *H02M 1/083* (2013.01); *H02M 3/337* (2013.01);
(Continued)

(58) Field of Classification Search
CPC ..... H02M 2007/4815; H02M 3/33553; H02M 2001/0058; H02M 2001/0054;
(Continued)

(56) References Cited

U.S. PATENT DOCUMENTS

| 5,946,200 A | 8/1999 | Kim et al. |
| 2002/0075698 A1* | 6/2002 | Kuranuki ................ H02M 1/34 |
| | | 363/17 |

(Continued)

FOREIGN PATENT DOCUMENTS

| JP | 9-224374 A | 8/1997 |
| JP | 2004-140913 A | 5/2004 |

(Continued)

OTHER PUBLICATIONS

International Search Report dated Jul. 11, 2017 in PCT/JP2017/017635 filed May 10, 2017.
Extended European Search Report dated Sep. 3, 2019, in Patent Application No. 17855245.1, 9 pages.

*Primary Examiner* — Harry R Behm
(74) *Attorney, Agent, or Firm* — Oblon, McClelland, Maier & Neustadt, L.L.P.

(57) ABSTRACT

A full-bridge inverter is configured with a parallel connection of a first leg and a second leg, and controlled in a dual-leg resonant mode in which a positive-side switching element of the first leg and a negative-side switching element of the second leg are turned on/off at the same time and a negative-side switching element of the first leg and a positive-side switching element of the second leg are turned on/off at the same time, and controlled in a single-leg resonant mode in which the positive-side switching element of the first leg and the negative-side switching element of the second leg, and the negative-side switching element of the (Continued)

first leg and the positive-side switching element of the second leg are turned on/off shiftedly in time by a phase shift amount.

10 Claims, 13 Drawing Sheets

(51) Int. Cl.
    *H02M 7/5387*     (2007.01)
    *H02M 3/337*     (2006.01)
    *H02M 1/00*     (2006.01)
    *H02M 7/48*     (2007.01)
    *H02M 1/38*     (2007.01)

(52) U.S. Cl.
    CPC .......... *H02M 7/53871* (2013.01); *H02M 1/38* (2013.01); *H02M 2001/0009* (2013.01); *H02M 2001/0058* (2013.01); *H02M 2007/4815* (2013.01); *H02M 2007/53878* (2013.01)

(58) Field of Classification Search
    CPC ..... H02M 2001/0035; H02M 3/33569; H02M 7/53871
    See application file for complete search history.

(56) References Cited

U.S. PATENT DOCUMENTS

| | | | | |
|---|---|---|---|---|
| 2009/0244934 | A1* | 10/2009 | Wang | H02M 3/33592 363/21.06 |
| 2010/0220500 | A1* | 9/2010 | Mino | H02M 1/32 363/17 |
| 2014/0146573 | A1* | 5/2014 | Yan | H02M 3/3376 363/17 |
| 2014/0268932 | A1* | 9/2014 | Gupta | H02M 7/493 363/40 |
| 2015/0055374 | A1* | 2/2015 | Yamashita | H02M 3/337 363/17 |
| 2015/0263646 | A1* | 9/2015 | Hara | B60L 53/36 363/17 |
| 2015/0381063 | A1* | 12/2015 | Takahara | H02M 3/3376 363/17 |

FOREIGN PATENT DOCUMENTS

| | | |
|---|---|---|
| JP | 2006-230075 A | 8/2006 |
| JP | 2011-130577 A | 6/2011 |
| JP | 2013-188089 A | 9/2013 |

\* cited by examiner

POWER CONVERSION DEVICE WITH OPERATION IN DUAL-LEG RESONANT MODE OR SINGLE-LEG RESONANT MODE

TECHNICAL FIELD

The present invention relates to a power conversion device that includes a full-bridge inverter for converting a DC voltage into a high-frequency AC voltage to output the AC voltage to a transformer and a rectifier circuit for rectifying the output of the transformer.

BACKGROUND ART

A primary-side phase-shift DC-DC converter combined with a full-bridge inverter and a rectifier circuit is typically configured as follows. The full-bridge inverter is made up of the following circuit. The circuit is configured with two legs: a first leg and a second leg connected in parallel, each leg has two switching elements constituting arms connected in series, each arm has a capacitor connected in parallel with the switching element and a diode connected in anti-parallel therewith; and both ends of the parallel-connected legs serve as the input terminals, and points in the connections between the arms of the first leg and between the arms of the second leg serve as the output terminals.

The full-bridge inverter converts a DC voltage supplied across the input terminals into a high-frequency AC voltage, to output the high-frequency AC voltage to the primary side of a transformer connected to the output terminals. The secondary side of the transformer is connected to the rectifier circuit, and the rectifier circuit rectifies the high-frequency AC voltage output from the transformer. High-frequency components in the output of the rectifier circuit are removed by an output smoothing filter and the resultant DC voltage is supplied to a load.

The full-bridge inverter thus configured typically controls its transmission power using phase shift control. The phase shift control controls the transmission power by varying the overlap angle between the first leg and the second leg. Further, the phase shift control enables soft switching operation to reduce switching loss by connecting a reactor in series with the primary winding of the transformer. In a state of the second leg being delayed in phase with respect to the first leg, the two switching elements constituting the first leg operate the soft switching with zero-voltage and zero-current switching (ZV&ZCS) turn-on utilizing current continuity in the reactor and with zero-voltage switching (ZVS) turn-off utilizing the tangent of the rising voltage of the capacitor connected in parallel with each switching element; on the other hand, the two switching elements constituting the second leg operate the soft switching with ZVS turn-on and ZVS turn-off utilizing a resonance phenomenon caused by the reactor and the capacitor connected with each switching element.

However, a circulation period is needed to enable the first leg to turn on with ZV&ZCS. The circulation period is a period during which a current is conducted between the positive-side arms or between the negative-side arms in the primary side and no power is transmitted. The circulating current, since it makes no contribution to the transmission power to the load, results in reactive power, thus raising a problem of conduction loss caused by the circulating current in the switching elements, the diodes, and the transformer. Moreover, setting the circulation period reduces the power transmission period and limits the transmission power from the transformer. Although setting the transformer turns ratio to high is a conceivable technique as a countermeasure for enabling power to be transmitted to the secondary side even in a narrow power-transmission period, the voltage applied across the secondary-side diodes increases, thus leading to the need for using an element having a higher withstand voltage. Since diodes generally show a positive correlation between the withstand voltage and the conduction characteristic, using a diode having a high withstand voltage poses a problem of increasing conduction loss.

Patent Document 1 discloses a method for overcoming these problems. The method disclosed in Patent Document 1 is that a capacitor is connected between the rectifier circuit and the output smoothing filter to advance the current passing through the transformer with respect to the voltage applied thereto and to increase time product of the voltage applied to the transformer and the current passing therethrough, whereby the transmission power from the transformer is improved.

PRIOR ART DOCUMENT

Patent Document

Patent Document 1: JP2006-230075 A

SUMMARY OF THE INVENTION

Problem that the Invention is to Solve

Such a power conversion device as disclosed in Patent Document 1, however, needs the capacitor as an additional part, thus raising a problem of increasing cost. Furthermore, the additional capacitor also generates loss, thus posing a problem of reducing the loss reduction effect.

The present invention is made to resolve the aforementioned problems, and aimed at providing a power conversion device that has a compact and low-cost full-bridge inverter and is capable of increasing power to be supplied to a load without adding additional parts.

Means for Solving the Problem

The power conversion device according to the present invention includes a full-bridge inverter configured with a parallel connection of two legs: a first leg and a second leg, each having two switching elements constituting respective arms connected in series, each arm having a capacitor connected in parallel with the switching element and a diode connected in anti-parallel with the switching element; a rectifier circuit connected to a secondary side of the transformer; and a controller configured to control the switching elements constituting the arms of the first leg and the second leg, wherein one end of the parallel connected legs is connected to a positive terminal of a DC power source and the other end is connected to a negative terminal of the DC power source, and a point in the series connection between the arms of the first leg and a point in the series connection between the arms of the second leg are connected to a primary side of a transformer, to supply an AC voltage to the primary side of the transformer. The controller controls the inverter to operate in a dual-leg resonant mode in which the positive-side switching element constituting the positive-side arm of the first leg and the negative-side switching element constituting the negative-side arm of the second leg are turned on and off at the same time and the negative-side switching element constituting the negative-side arm of the first leg and the positive-side switching element constituting the positive-side arm of the second leg are turned on and off at the same time, or to operate in a single-leg resonant mode in which the positive-side switching element of the first leg and the negative-side switching element of the second leg are turned on and off shiftedly in time by a phase shift amount, and the negative-side switching element of the first leg and the positive-side switching element of the second leg are turned on and off shiftedly in time by a phase shift amount.

Advantage Effect of the Invention

A power conversion device according to the present invention can switch the single-leg resonant-mode operation and the dual-leg resonant-mode operation to each other in response to load conditions and the like, so that power to be transmitted from the transformer can be increased without adding additional parts nor increasing the turns ratio of the transformer, thus being able to improve the power conversion efficiency.

EMBODIMENTS FOR CARRYING OUT THE INVENTION

Embodiment 1

Figure 1:
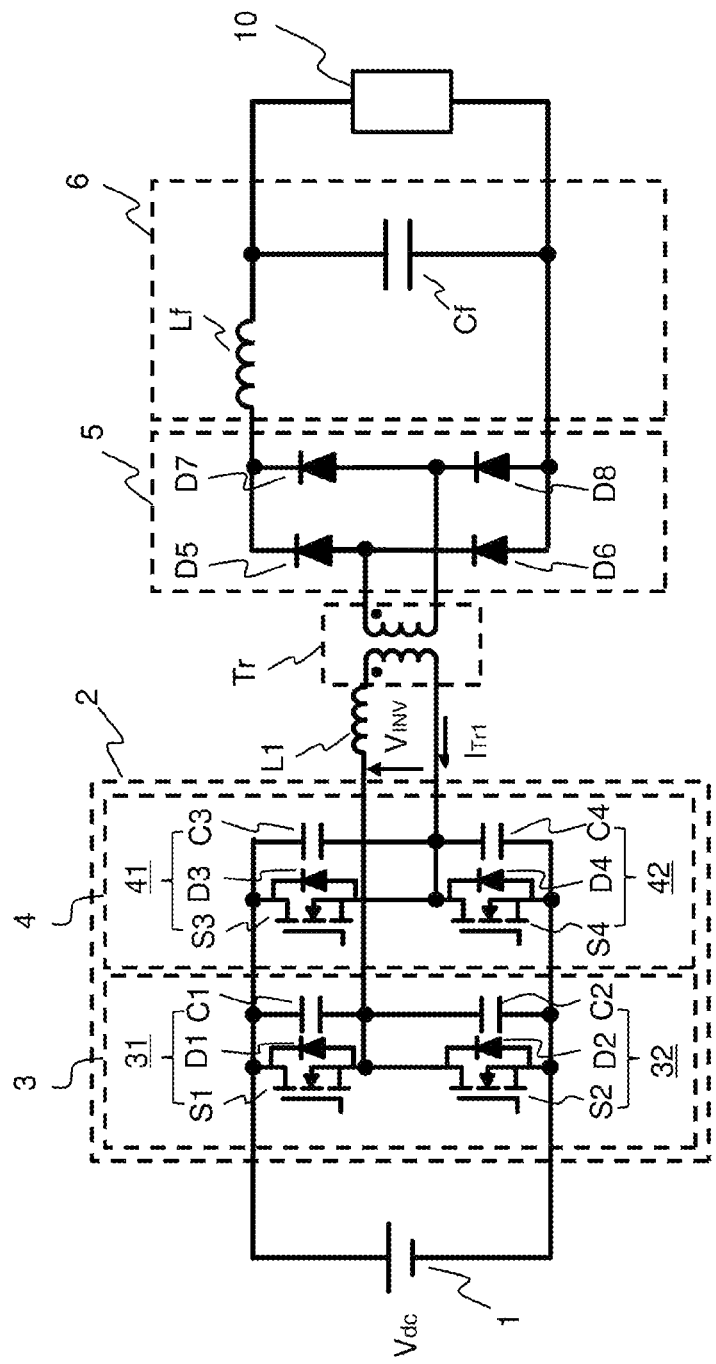
FIG. 1 is an exemplary circuit diagram of a whole system including a power conversion system including a power conversion device according to Embodiment 1 of the present invention.

FIG. 1 is an exemplary circuit diagram of a power conversion device according to Embodiment 1 of the present invention. Referring to FIG. 1, a full-bridge inverter 2 converts the DC voltage of a DC power source 1 into a high-frequency AC voltage to output the AC voltage to a transformer Tr; a rectifier circuit 5 rectifies the high-frequency AC voltage output from the transformer Tr; and an output smoothing filter 6 removes high frequency components in the voltage output from the rectifier circuit 5, to supply a DC power to a load 10.

The full-bridge inverter 2 is configured with a parallel connection of a first leg 3 and a second leg 4 each having series-connected switching elements. The first leg 3 is configured with a series connection of a positive-side arm 31 having a switching element S1, a capacitor C1 connected in parallel with the switching element S1, and a freewheel diode D1 connected in anti-parallel with the switching element S1; and of a negative-side arm 32 having a switching element S2, a capacitor C2 connected in parallel with the switching element S2, and a freewheel diode D2 connected in anti-parallel with the switching element S2. The second leg 4 is configured with a series connection of a positive-side arm 41 having a switching element S3, a capacitor C3 connected in parallel with the switching element S3, and a freewheel diode D3 connected in anti-parallel with the switching element S3; and of a negative-side arm 42 having a switching element S4, a capacitor C4 connected in parallel with the switching element S4, and a freewheel diode D4 connected in anti-parallel with the switching element S4. The end of the positive-side arms 31, 41 and the end of the negative-side arms 32, 42 of the parallel circuit of the first leg 3 and the second leg 4 connected in parallel serve as a positive-side input terminal and a negative-side input terminal, respectively, and the output voltage of the DC power source 1 is applied across these terminals. Note that the switching elements S1, S3 and the switching elements S2, S4 are also referred to as positive-side switching elements and negative-side switching elements, respectively.

A point of the connection between the positive-side arm 31 and the negative-side arm 32 of the first leg 3 and a point of the connection between the positive-side arm 41 and the negative-side arm 42 of the second leg 4 are output terminals of the full-bridge inverter 2, and a voltage $V_{INV}$ applied across these output terminals of the inverter is supplied to the primary winding of the transformer Tr via a series-connected reactor L1. The secondary winding of the transformer Tr is connected to the rectifier circuit 5 made up of diodes D5 to D8, and the output smoothing filter 6 and the load 10 are connected between the output terminals of the rectifier circuit.

In addition, a transistor, such as an insulated gate bipolar transistor (IGBT) with an anti-parallel connected diode or a metal oxide semiconductor field effect transistor (MOSFET) with a diode connected between its source and its drain, is preferably used for the switching elements S1 to S4. Moreover, the freewheel diodes D1 to D4 can be replaced with the respective diodes incorporated in the IGBTs or the MOSFETs or with external diodes connected separately. The capacitors C1 to C4 may be connected externally, or the respective output capacitances of the IGBTs or the MOSFETs may be utilized in place of these capacitors. Furthermore, leakage inductance of the transformer Tr or a separate reactor may be substituted as the series-connected reactor L1.

The power conversion device according to Embodiment 1 of the present invention is able to operate in two modes: a single-leg resonant mode and a dual-leg resonant mode. In the single-leg resonant mode, either one of the first leg 3 and the second leg 4 performs soft switching operation with zero-voltage switching (ZVS) utilizing a resonance phenomenon caused by the capacitor and the reactor at turn-on and turn-off, and the other leg performs the soft switching operation with zero-voltage and zero-current switching (ZV&ZCS) utilizing a circulating current at turn-on and performs a soft switching operation with the ZVS utilizing the slope of the rising voltage of the capacitor at turn-off. In the dual-leg resonant mode, all switching elements perform the soft switching operation with the ZVS utilizing the resonance phenomenon caused by the capacitors and the reactor at turn-on and turn-off.

Figure 2:
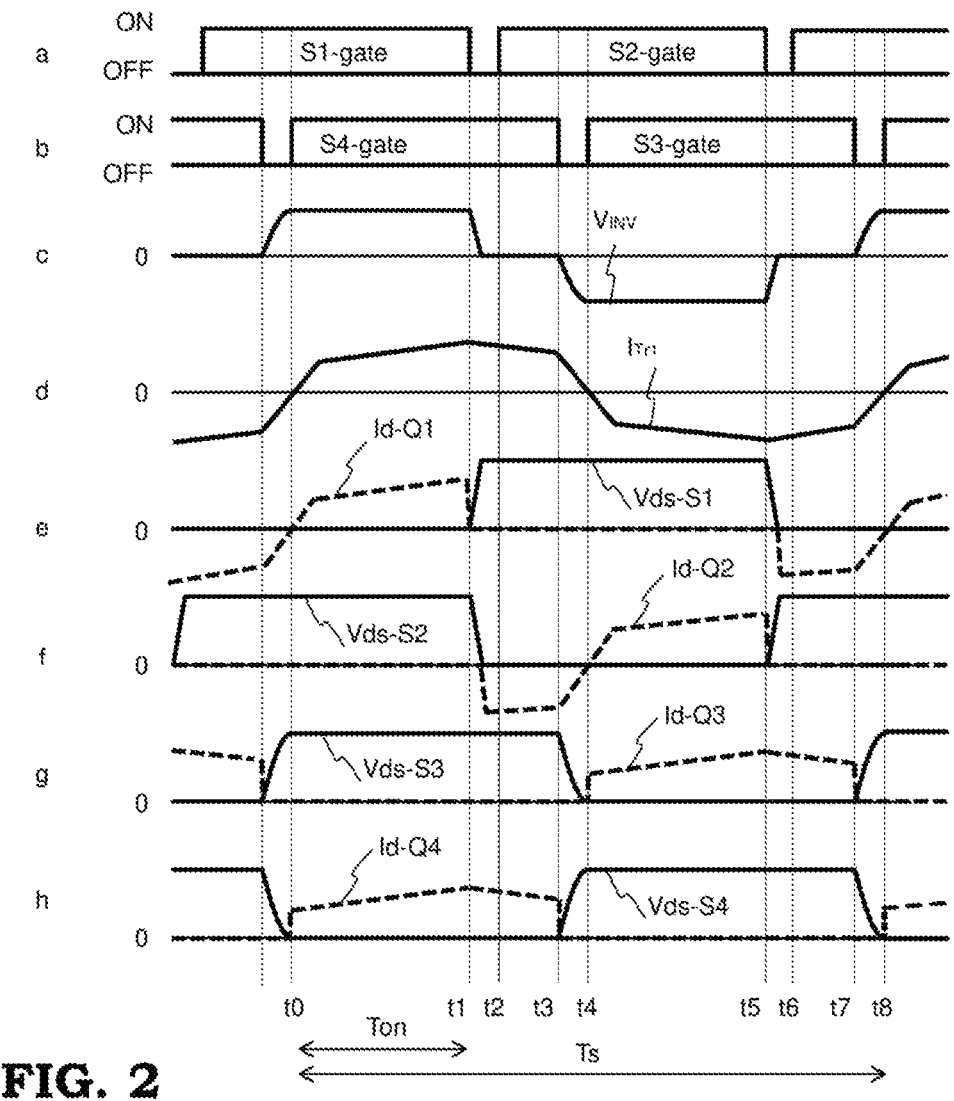
FIG. 2 shows time charts of a single-leg resonant-mode operation of the power conversion device according to Embodiment 1 of the present invention.

Next, the single-leg resonant-mode operation is described with reference to FIG. 2. FIG. 2 shows time charts during a period of about one cycle in a case of delaying the phase of the second leg 4 with respect to that of the first leg 3. Here, the description is made for a case of using MOSFETs as the switching elements constituting the inverter 2 shown in the circuit configuration of FIG. 1. In FIG. 2, the time chart a indicates drive signals supplied respectively to the gates of the switching elements S1, S2 of the first leg 3, and the time chart b indicates drive signals supplied respectively to the gates of the switching elements S3, S4 of the second leg 4. As shown in the time charts a and b in FIG. 2, the positive-side switching element and the negative-side switching element of each leg repeat on and off one after another. The time chart c in FIG. 2 indicates the voltage $V_{INV}$ (output voltage of the inverter) input to the transformer, and the time chart d in the same figure indicates a current $I_{Tr1}$ flowing through the primary winding of the transformer. The time charts e to h in the same figure indicate voltages $V_{ds-S1}$ to $V_{ds-S4}$ across the switching elements S1 to S4 by the solid lines and indicate total currents Id-Q1 to Id-Q4 flowing through the switching elements S1 to S4 and the freewheel diodes D1 to D4 of the arms, respectively.

Note that the times t0 to t8 represent timings at which the switching elements S1 to S4 are switched; and Vds's represent the drain voltages of the switching elements with respect to the source potentials thereof, and Id's represent the currents of the switching elements taking the direction of inflow from the drains as positive.

An operating state of the inverter in accordance with the switching pattern of the mode is described below with reference to FIG. 2. At the time t0 at which the switching element S1 of the positive-side arm 31 of the first leg 3 is in the ON-state, the switching element S4 of the negative-side arm 42 of the second leg 4 is turned on. The voltage $V_{INV}$ of the inverter 2 is output in the direction indicated by the arrow in FIG. 1, so that power is supplied to the load 10.

At the time t1, the switching element S1 of the positive-side arm 31 of the first leg 3 is turned off to interrupt the voltage output from the inverter 2, with the switching element S4 of the negative-side arm 42 of the second leg 4 being maintained in the ON-state. At this moment, a current induced by an energy stored in the series-connected reactor L1 circulates through a path from the series-connected reactor L1, via the switching element S4 of the negative-side arm 42 of the second leg 4 and the freewheel diode D2 of the negative-side arm 32 of the first leg 3, back to the series-connected reactor L1. And the capacitor C2 of the negative-side arm 32 of the first leg 3 discharges and the capacitor C1 of the positive-side arm 31 of the first leg 3 is charged. This charging operation causes the voltage of the switching element S1 of the positive-side arm 31 of the first leg 3 to rise slowly, so that the turn-off operation of the switching element S1 of the positive-side arm 31 of the first leg 3 results in the soft switching with zero-voltage switching (ZVS).

At the time t2, the switching element S2 of the negative-side arm 32 of the first leg 3 is turned on, with the switching element S4 of the negative-side arm 42 of the second leg 4 being maintained in the ON-state. At this moment, the current path is unchanged: the current originated in the series-connected reactor L1 circulates through the path from the series-connected reactor L1, via the switching element S4 of the negative-side arm 42 of the second leg 4 and the switching element S2 of the negative-side arm 32 of the first leg 3, back to the series-connected reactor L1. Since the capacitor C2 of the negative-side arm 32 of the first leg 3 has been discharged at the time t1, the turn-on operation of the switching element S2 of the negative-side arm 32 of the first leg 3 results in the soft switching with zero-voltage and zero-current switching (ZV&ZCS).

At the time t3, the switching element S4 of the negative-side arm 42 of the second leg 4 is turned off, with the switching element S2 of the negative-side arm 32 of the first leg 3 being maintained in the ON-state. At this moment, voltage across the switching element S4 of the negative-side arm 42 of the second leg 4 rises due to a resonance phenomenon caused by the capacitor C3 of the positive-side arm 41 of the second leg 4 and the capacitor C4 of the negative-side arm 42 of the second leg 4 and the series-connected reactor L1, and the voltage across the switching element S3 of the positive-side arm 41 of the second leg 4 fall at the same time. Thus, the turn-off operation of the switching element S4 of the negative-side arm 42 of the second leg 4 results in the soft switching with zero-voltage switching (ZVS).

At the time t4, the switching element S3 of the positive-side arm 41 of the second leg 4 is turned on, with the switching element S2 of the negative-side arm 32 of the first leg 3 being maintained in the ON-state. At this moment, the voltage across the switching element S3 of the positive-side arm 41 of the second leg 4 has fallen to zero due to the resonance phenomenon, so that the turn-on operation of the switching element S3 of the positive-side arm 41 of the second leg 4 results in the soft switching with zero-voltage switching (ZVS). The description of the operating state during the times t4 to t8 is omitted because the state is symmetrical to that during the times t0 to t4.

In FIG. 2, each of the periods between t1 and t2, t3 and t4, t5 and t6, and between t7 and t8 is a dead time $T_d$. The dead time is set to prevent a short circuit between the positive-side arm and the negative-side arm of each leg. Moreover, the phase shift control needs the circulation period $T_f$ to be set to enable the soft switching of one of the legs using the circulating current. The circulation periods $T_f$ are between t1 and t3 and between t5 and t7 in FIG. 2. The effective on-duty D-Tr (maximum of 0.5) of the voltage applied across the transformer is expressed by the following equation (1):

$$D - Tr = \frac{\frac{T_{on}}{2} - T_d - T_f}{\frac{T_s}{2}}, \quad (1)$$

where $T_s$ is the switching cycle (for example, the period between t0 and t8), and $T_{on}$ is the period during which the switching element of the positive-side arm and the switching element of the negative-side arm are concurrently in the ON-state (for example, the period between t0 and t1).

On the other hand, the resonance phenomenon beginning at the time t3 is caused by the parallel connection of the series-connected reactor L1 with the capacitor C3 and the capacitor C4. Letting the capacitances of the capacitors C3 and C4 be C3=C4=C and the inductance of the series-connected reactor L1 be the angular frequency $\omega_r$ of the resonance is $1/\sqrt{L_1 \ast 2C}$. Accordingly, a period $t_{v0}$, during which the voltage across the switching element falls from the voltage $V_{dc}$ of the DC power source 1 to 0 [V] due to the resonance phenomenon, is expressed by the following equation (2):

$$t_{v0} = \frac{1}{\omega_r} \sin^{-1}\left(\frac{V_{dc}}{\omega_r L_1 I_1}\right) = \sqrt{L_1 \cdot 2C} \cdot \sin^{-1}\left(\frac{V_{dc}}{I_1} \cdot \sqrt{\frac{2C}{L_1}}\right), \quad (2)$$

where $I_1$ is a current passing through the switching elements at the switching.

On the other hand, a period $t_{i0}$, during which the transformer current $I_{Tr1}$ decreases to 0 [A] after the switching elements S4 and S3 of the second leg are turned off at the times t3 and t7, is expressed by the following equation (3):

$$t_{i0} = t_{v0} + L_1 \frac{I_{Tr1}(t = t_{v0})}{V_{dc}} = \quad (3)$$

$$t_{v0} + \frac{L_1}{V_{dc}} \cdot I_1 \cos(\omega_r t_{v0}) = t_{v0} + \frac{L_1}{V_{dc}} \cdot I_1 \cos\left(\frac{t_{v0}}{\sqrt{L_1 \cdot 2C}}\right).$$

Setting the dead time $T_d$ as $t_{v0} \leq T_d \leq t_{i0}$ allows the switching elements S3 and S4 to operate the soft switching with ZVS utilizing the resonance phenomenon.

Figure 3:
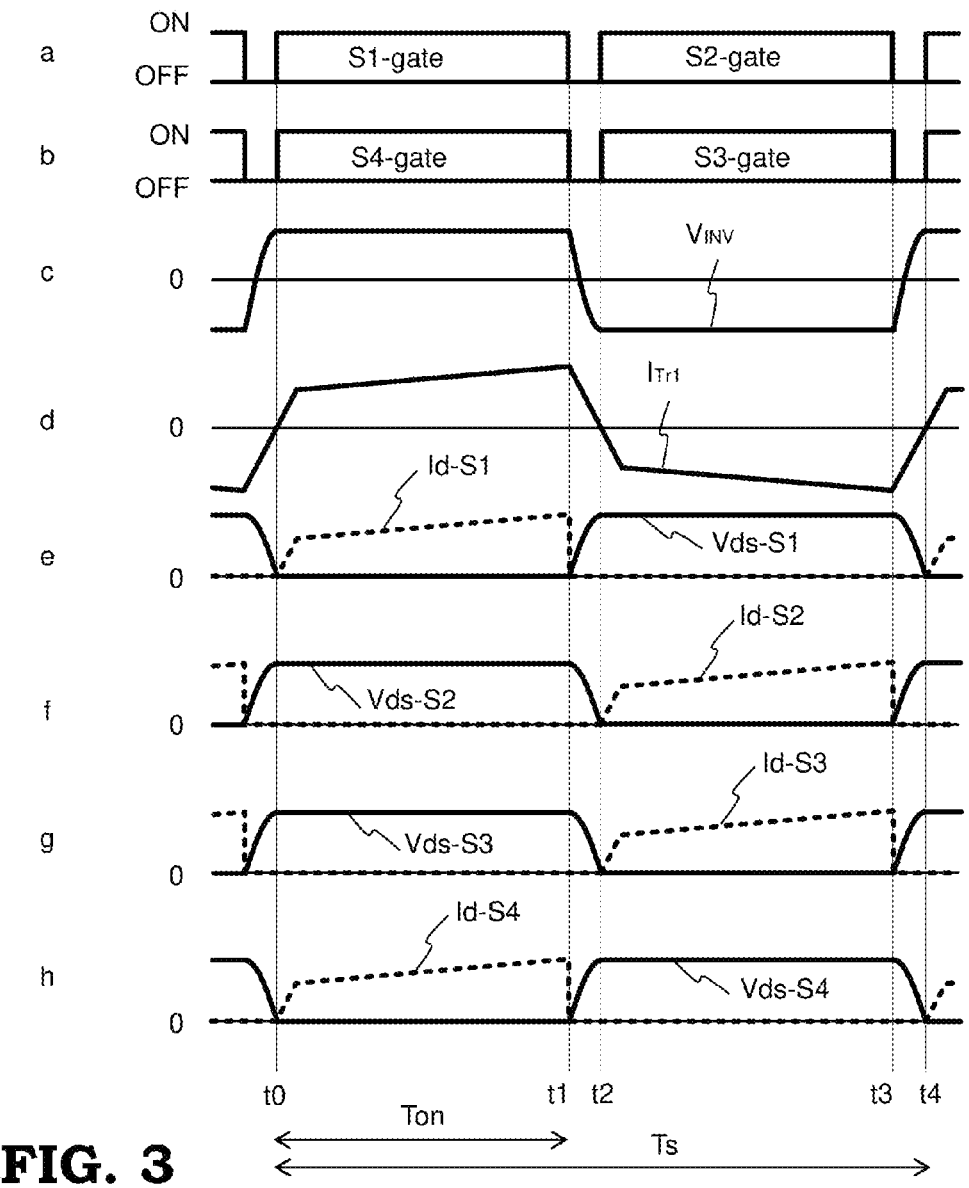
FIG. 3 shows time charts of a dual-leg resonant-mode operation of the power conversion device according to Embodiment 1 of the present invention.

Next, the dual-leg resonant-mode operation is described with reference to FIG. 3. In the dual-leg resonant mode, the first leg 3 and the second leg 4 operate in phase synchronism with each other as shown in FIG. 3. As with the description of the single-leg resonant mode, the description of the dual-leg resonant-mode operation is made for the case of using MOSFETs as the switching elements constituting the inverter 2 shown in the circuit configuration of FIG. 1. In FIG. 3, the time chart a indicates drive signals supplied respectively to the gates of the switching elements S1, S2 of the first leg 3, and the time chart b indicates drive signals supplied respectively to the gates of the switching elements S3, S4 of the second leg 4. As shown in the time charts a and b in FIG. 3, the positive-side switching element and the negative-side switching element of each leg repeat on and off one after another. The time chart c in FIG. 3 indicates the voltage $V_{INV}$ (output voltage of the inverter) input to the transformer, and the time chart d in the same figure indicates the current $I_{Tr1}$ flowing through the primary winding of the transformer. The time charts e to h in the same figure indicate the voltages Vds-S1 to Vds-S4 across the switching elements S1 to S4 by the solid lines and indicate the total currents Id-S1 to Id-S4 flowing through the switching elements S1 to S4 and the freewheel diodes D1 to D4 by the dashed lines, respectively. Note that in the dual-leg resonant mode, no currents flow through the freewheel diodes D1 to D4 and the energy for the circulation is stored in the capacitors.

At the time t0, the switching element S1 of the positive-side arm 31 of the first leg 3 and the switching element S4 of the negative-side arm 42 of the second leg 4 are turned on. The voltage $V_{INV}$ of the inverter 2 is output in the direction indicated by the arrow in FIG. 1, so that power is supplied to the load 10.

At the time t1, the switching element S1 of the positive-side arm 31 of the first leg 3 and the switching element S4 of the negative-side arm 42 of the second leg 4 are turned off to interrupt the voltage output from the inverter 2. At this moment, the voltages across the switching element S1 of the positive-side arm 31 of the first leg 3 and across the switching element S4 of the negative-side arm 42 of the second leg 4 rise due to the resonance phenomenon caused by the capacitors C1 to C4 and the series-connected reactor L1; and the voltages across the switching element S2 of the negative-side arm 32 of the first leg 3 and across the switching element S3 of the positive-side arm 41 of the second leg 4 fall at the same time. Thus, the turn-off operations of the switching element S1 of the positive-side arm 31 of the first leg 3 and the switching element S4 of the negative-side arm 42 of the second leg 4 results in the soft switching with ZVS.

At the time t2, the switching element S2 of the negative-side arm 32 of the first leg 3 and the switching element S3 of the positive-side arm 41 of the second leg 4 are turned on. At this moment, the voltages across the switching element S2 of the negative-side arm 32 of the first leg 3 and the switching element S3 of the positive-side arm 41 of the second leg 4 have fallen to zero by the resonance phenomenon, so that the turn-on operations of the switching element S2 of the negative-side arm 32 of the first leg 3 and the switching element S3 of the positive-side arm 41 of the second leg 4 results in the soft switching with ZVS. The description of the operating state during the times t2 to t4 is omitted because the state is symmetrical to that during the times t0 to t2.

In FIG. 3, each of the periods between t1 and t2 and between t3 and t4 is the dead time $T_d$. The dead time is set to prevent a short circuit between the positive-side arm and the negative-side arm of each leg. The effective on-duty D-Tr (maximum of 0.5) of the voltage applied across the transformer is expressed by the following equation (4):

$$D - Tr = \frac{\frac{T_{on}}{2} - T_d}{\frac{T_s}{2}}. \quad (4)$$

On the other hand, the resonance phenomenon beginning at the times t1 and t3 is caused by the parallel connection of the series-connected reactor L1 with the capacitors C1 and C3 connected in series and with the capacitors C2 and C4 connected in series. Letting the capacitances of the capacitors C1, C2, C3, C4 be C1=C2=C3=C4=C and the inductance of the series-connected reactor L1 be $L_1$, the angular frequency $\omega_r$ of the resonance is $1/\sqrt{L_1 \ast C}$, which is different from the resonant angular frequency in the single-leg resonant mode. Accordingly, the period $t_{v0}$, during which the voltages across the switching elements S2, S3 and S1, S4 fall from the voltage $V_{dc}$ of the DC power source 1 to 0 [V] when the switching elements are turned on, is expressed by the following equation (5):

$$t_{v0} = \frac{1}{\omega_r}\sin^{-1}\left(\frac{V_{dc}}{\omega_r L_1 I_1}\right) = \sqrt{L_1 \cdot C} \cdot \sin^{-1}\left(\frac{V_{dc}}{I_1} \cdot \sqrt{\frac{C}{L_1}}\right), \quad (5)$$

where $I_1$ is a switching current passing through the switching elements at the switching.

On the other hand, the period $t_{i0}$, during which the transformer current $I_{tr1}$ decreases to 0 [A] after the switching elements S1, S4 and S2, S3 are turned off at the times t1 and t3, is expressed by the following equation (6):

$$t_{i0} = t_{v0} + L_1 \frac{I_{Tr1}(t = t_{v0})}{V_{dc}} =$$

$$t_{v0} + \frac{L_1}{V_{dc}} \cdot I_1 \cos(\overline{\omega}_r t_{v0}) = t_{v0} + \frac{L_1}{V_{dc}} \cdot I_1 \cos\left(\frac{t_{v0}}{\sqrt{L_1 \cdot C}}\right) \quad (6)$$

Setting the dead time $T_d$ as $t_{v0} \leq T_d \leq t_{i0}$ allows the switching elements S1 to S4 to operate the soft switching with ZVS utilizing the resonance phenomenon.

The operation mode of the power conversion device shown in FIG. 1 is changed in response to a condition of the voltage of the DC power source 1 and a condition of the load. The relationship between a phase shift amount D-PS and the voltage $V_{dc}$ of the DC power source 1 and a load voltage $V_{out}$, is expressed by the following equation (7) using the turns ratio N of the transformer:

$$D - PS = \frac{V_{out}}{NV_{dc}}. \quad (7)$$

When the DC power source 1 or the load voltage $V_{out}$ varies, there are both conditions for the inverter to operate in the single-leg resonant mode and the dual-leg resonant mode.

Here, comparing the period $t_{v0}$ and the period $t_{i0}$ in the single-leg resonant mode with those in the dual-leg resonant mode, both periods in the single-leg resonant mode are longer as seen from the equations (2), (3), (5), (6). For that reason, the set value of the dead time $T_d$ may be altered for the operation mode switched between the single-leg resonant mode and the dual-leg resonant mode.

Figure 4:
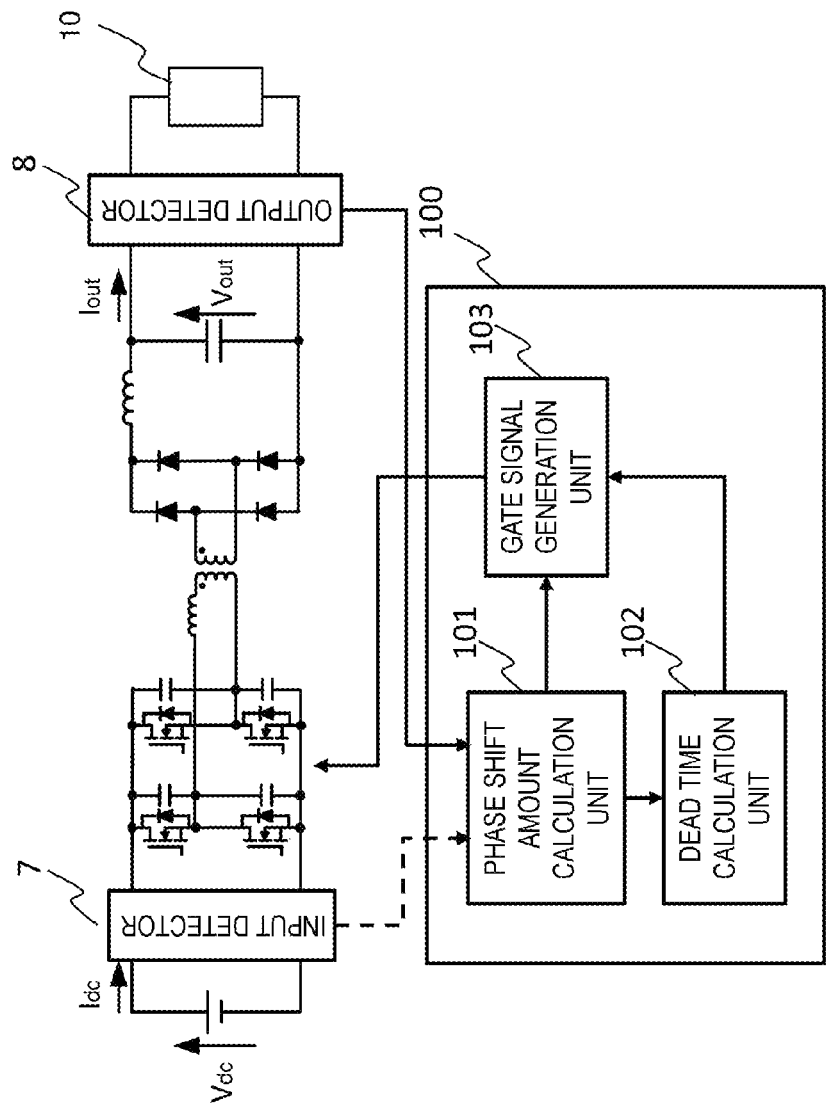
FIG. 4 is a block diagram showing the configuration of the power conversion device according to Embodiment 1 of the present invention.

FIG. 4 shows an exemplary block diagram of a controller 100 for controlling each switching element, of the power conversion device according to Embodiment 1 of the present invention, in the cases of switching the operation mode between the single-leg resonant mode and the dual-leg resonant mode and of altering the dead time. An input detector 7 is connected in parallel with the DC power source 1 to detect the voltage $V_{dc}$ and the current $I_{dc}$ of the DC power source 1. An output detector 8 is further connected in parallel with the load 10 to detect the voltage $V_{out}$ and the current $I_{out}$ output to the load 10.

The controller 100 has a phase shift amount calculation unit 101 for calculating the phase shift amount D-PS on the basis of at least one of values detected by the input detector 7 and the output detector 8; a dead time calculation unit 102 for calculating the dead time $T_d$ on the basis of the calculated phase shift amount D-PS and a gate signal generation unit 103 for generating gate signals on the basis of the calculated phase shift amount D-PS and the calculated dead time $T_d$. The controller 100 is implemented by a CPU executing programs stored in a memory or by a processing circuit formed such as in a system LSI. For example, the calculation units may be implemented by the CPU executing the respective programs stored in the memory or respectively implemented by the processing circuit in the system LSI.

Figure 5:
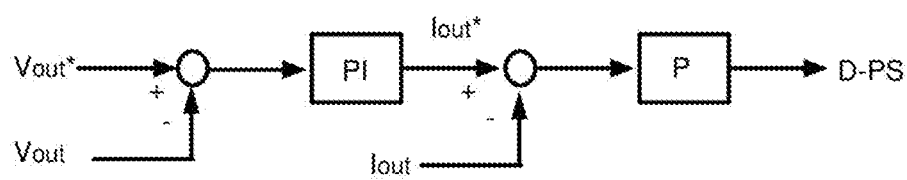
FIG. 5 is an exemplary block diagram showing the configuration of a phase shift amount calculation unit of the power conversion device according to Embodiment 1 of the present invention.
Figure 6:
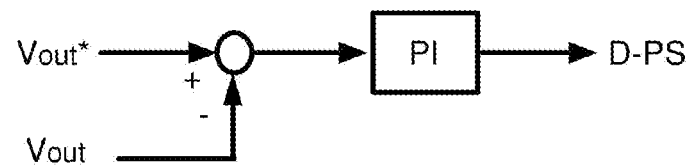
FIG. 6 is another exemplary block diagram showing the configuration of the phase shift amount calculation unit of the power conversion device according to Embodiment 1 of the present invention.
Figure 7:
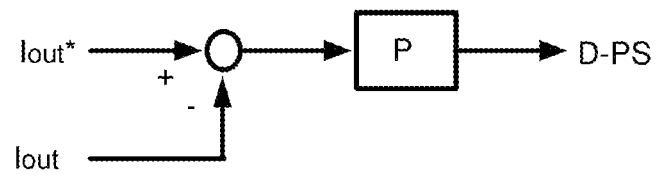
FIG. 7 is still another exemplary block diagram showing the configuration of the phase shift amount calculation unit of the power conversion device according to Embodiment 1 of the present invention.

FIG. 5 shows an exemplary block diagram of the phase shift amount calculation unit 101. The phase shift amount calculation unit 101 calculates the phase shift amount D-PS on the basis of the output of the output detector 8. Specifically, the deviation between the voltage value $V_{out}$ detected by the output detector 8 and a predetermined target load-voltage value $V_{out}^*$ is PI-controlled to calculate a target load-current value $I_{out}^*$; and then the deviation between the calculated target load-current value $I_{out}^*$ and the current value $I_{out}$ detected by the output detector 8 is P-controlled, to calculate the phase shift amount D-PS. The phase shift amount can also be calculated on the basis of the deviation between the voltage value $V_{out}$ detected by the output detector 8 and the predetermined target load-voltage value $V_{out}^*$, as shown in FIG. 6. Furthermore, if a target load-current value $I_{out}^*$ can be set, the phase shift amount can also be calculated on the basis of the deviation between the set target load-current value $I_{out}^*$ and the current value $I_{out}$ detected by the output detector 8, as shown in FIG. 7. While the examples of calculating the phase shift amount using the value(s) detected by the output detector 8 are shown in FIGS. 5 to 7, the phase shift amount D-PS may also be calculated on the basis of the voltage value $V_{dc}$ or the current value $I_{dc}$ of the DC power source 1, detected by the input detector 7. Whether to use detected value(s) of the output detector or the input detector to calculate the phase shift amount may be determined depending on what kind of the load is.

Figure 8:
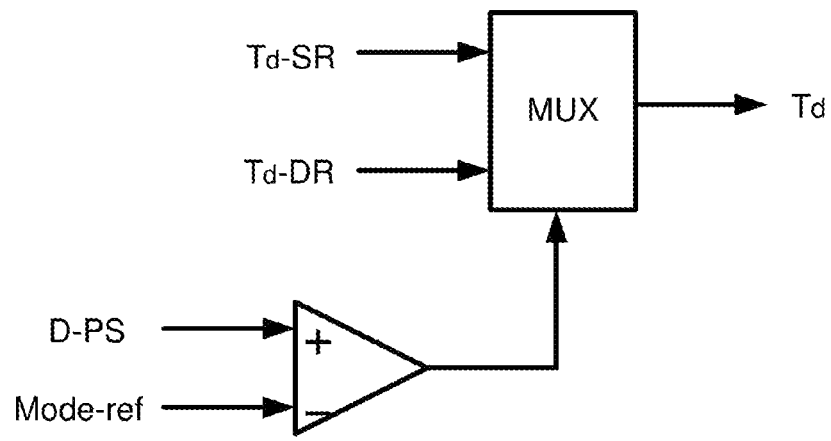
FIG. 8 is a block diagram showing the configuration of a dead time calculation unit of the power conversion device according to Embodiment 1 of the present invention.

FIG. 8 shows an exemplary block diagram of the dead time calculation unit 102. The magnitude relationship between a predetermined mode determining threshold Mode-ref and the calculated phase shift amount DPS is calculated by a comparator. When the calculated phase shift amount DPS is equal or smaller than the mode determining threshold Mode-ref, the operation mode is determined to be the dual-leg resonant mode, and a multiplexer outputs as the dead time $T_d$ a predetermined dead time Td-DR for the dual-leg resonant mode. When the calculated phase shift amount D-PS is larger than the mode determining threshold Mode-ref, on the other hand, the operation mode is determined to be the single-leg resonant mode, and the multiplexer outputs as the dead time $T_d$ a predetermined dead time $T_d$-SR for the single-leg resonant mode. Note that the predetermined dead time $T_d$-DR for the dual-leg resonant mode and the predetermined dead time $T_d$-SR for the single-leg resonant mode may be calculated on the basis of the detected value(s) of the input detector 7 or the output detector 8 using the equations (2), (3), (5), (6) or may be selected from a table or the like previously created.

Whether to operate the inverter in the dual-leg resonant mode or the single-leg resonant mode is determined not from the magnitude of calculated phase shift amount but may be determined simply from whether the magnitude itself of the input voltage value $V_{dc}$ or the input current value $I_{ds}$, or the output voltage value $V_{out}$ or the output current value $I_{out}$ is larger than corresponding one of respective thresholds for them. In this way, it is possible to determine whether to operate each switching element in the single-leg resonant mode or the dual-leg resonant mode, on the basis of at least one value of the input voltage, the input current, the output voltage, and the output current.

Figure 9:
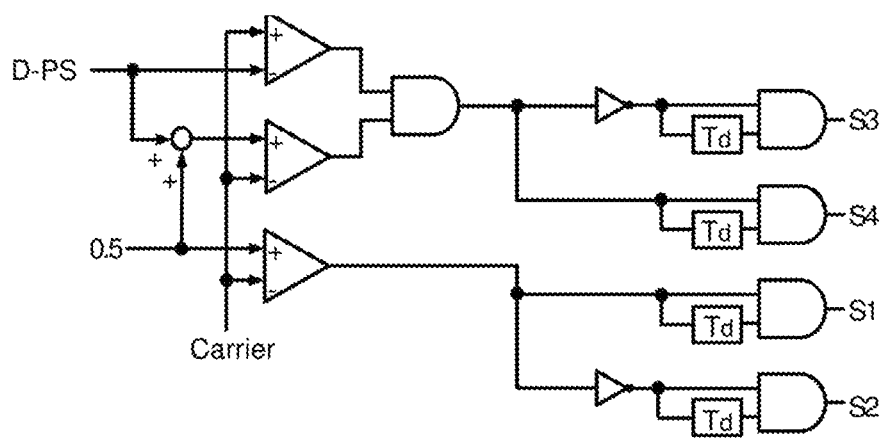
FIG. 9 is a block diagram showing the configuration of a gate signal calculation unit of the power conversion device according to Embodiment 1 of the present invention.

FIG. 9 shows an exemplary block diagram of a gate signal calculation unit 103. The gate signal calculation unit 103 generates the gate signals using the calculated phase shift amount D-PS and the calculated dead time $T_d$. The drive frequency is determined from the carrier signal Carrier. Note that in this control, the second leg 4 is delayed in phase with respect to the first leg 3 by the phase shift amount DPS. The outputs of the gate signal calculation unit 103 are input to the switching elements S1 to S4.

Figure 10:
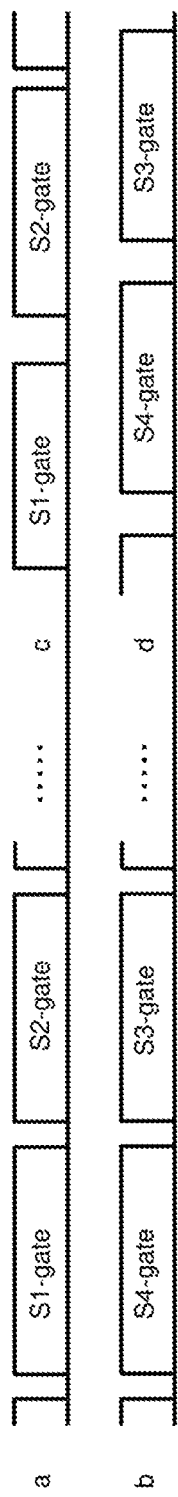
FIG. 10 shows time charts for explaining an example of the operation of the power conversion device according to Embodiment 1 of the present invention.
Figure 11:
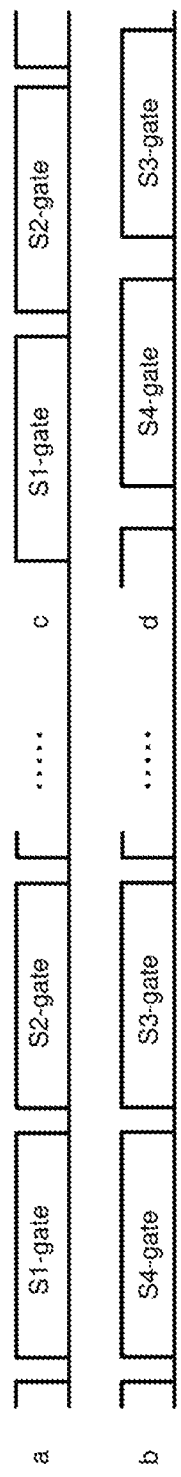
FIG. 11 shows time charts for explaining another example of the operation of the power conversion device according to Embodiment 1 of the present invention.

FIGS. 10 and 11 show examples of the gate signals in cases of setting the dead time variable for the operation mode switched between the single-leg resonant mode and the dual-leg resonant mode. The time charts a, b indicate the drive signals in the dual-leg resonant mode (D-PS=0) and the time charts c, d indicate those in the single-leg resonant mode. The dead time $T_d$ may be set equal for both legs in the single-leg resonant mode as shown in the time charts c, d of FIG. 10, or may be set different for the first leg 3 and for the second leg 4 as shown in the time charts c, d of FIG. 11.

In the case of setting the dead time equal for both legs in the single-leg resonant mode as shown in FIG. 10, since only one value needs to be calculated for the dead time $T_d$, processing load of the control unit such as a microcomputer can be reduced. In the case of setting the dead time different for the first leg 3 and the second leg 4 as shown in FIG. 11, on the other hand, dead times ideal for the respective legs can be set, thus more reducing switching loss.

Note that since the period $t_{v0}$ and the period $t_{i0}$ depend on the switching current $I_1$ as seen from the equations (2), (3), (5), (6), the dead time may be set variable in response to the magnitude of the load in the single-leg resonant mode and in the dual-leg resonant mode. Moreover, the leakage inductance of the transformer Tr may be substituted for the series-connected reactor L1, and also parasitic capacitances of the switching elements S1 to S4 may be substituted for the capacitors C1 to C4 connected in parallel with the switching elements S1 to S4.

As seen from the equations (1) and (4), the dual-leg resonant mode allows the effective on-duty D-Tr of the transformer to be increased compared with the operation only in the single-leg resonant mode. That is, the turns ratio N of the transformer can be set smaller.

In Embodiment 1, the first leg 3 and the second leg 4 both operate with the soft switching utilizing the resonance in the dual-leg resonant mode in which the circulation period is eliminated by setting to zero the difference in phase between the first leg 3 and the second leg 4. The transmission power is controlled by increasing the power transmission period in the dual-leg resonant mode under high output power conditions and by the single-leg resonant mode using the conventional phase shift control under low output power conditions. Varying continuously the phase shift amount D-PS by the feedback control allows the dual-leg resonant mode and the single-leg resonant mode to be switched continuously.

Figure 12:
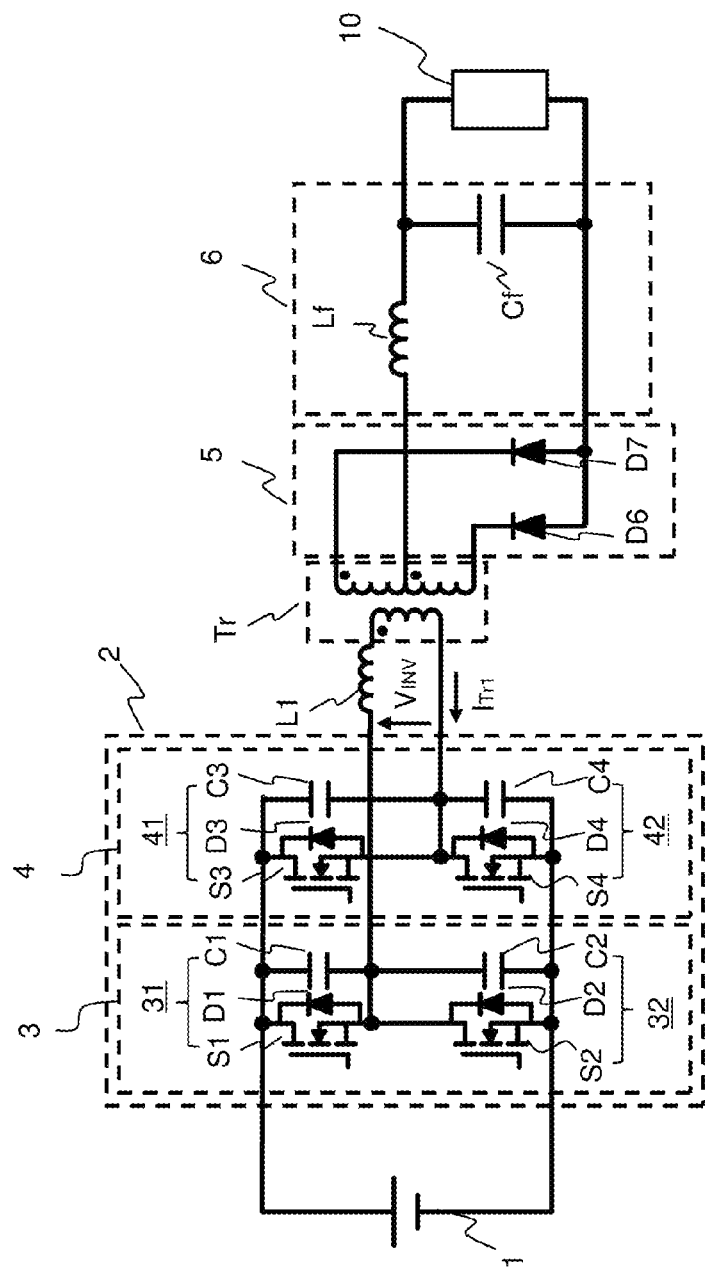
FIG. 12 is another exemplary circuit diagram showing the whole system including the power conversion device according to Embodiment 1 of the present invention.

In addition, the control method according to Embodiment 1 of the present invention can also be applied to a power conversion device that includes, as shown in FIG. 12, a transformer with a midpoint in the secondary winding and a rectifier circuit 5 having a center-tapped configuration.

From the above description, the withstand voltage of the diodes constituting the secondary-side rectifier circuit 5 can be reduced, thus allowing the diodes to be compact and to reduce power loss. Moreover, no circulating current can reduce conduction loss in the dual-leg resonant mode, thus also bringing about the effect of reducing power loss.

Embodiment 2

Figure 13:
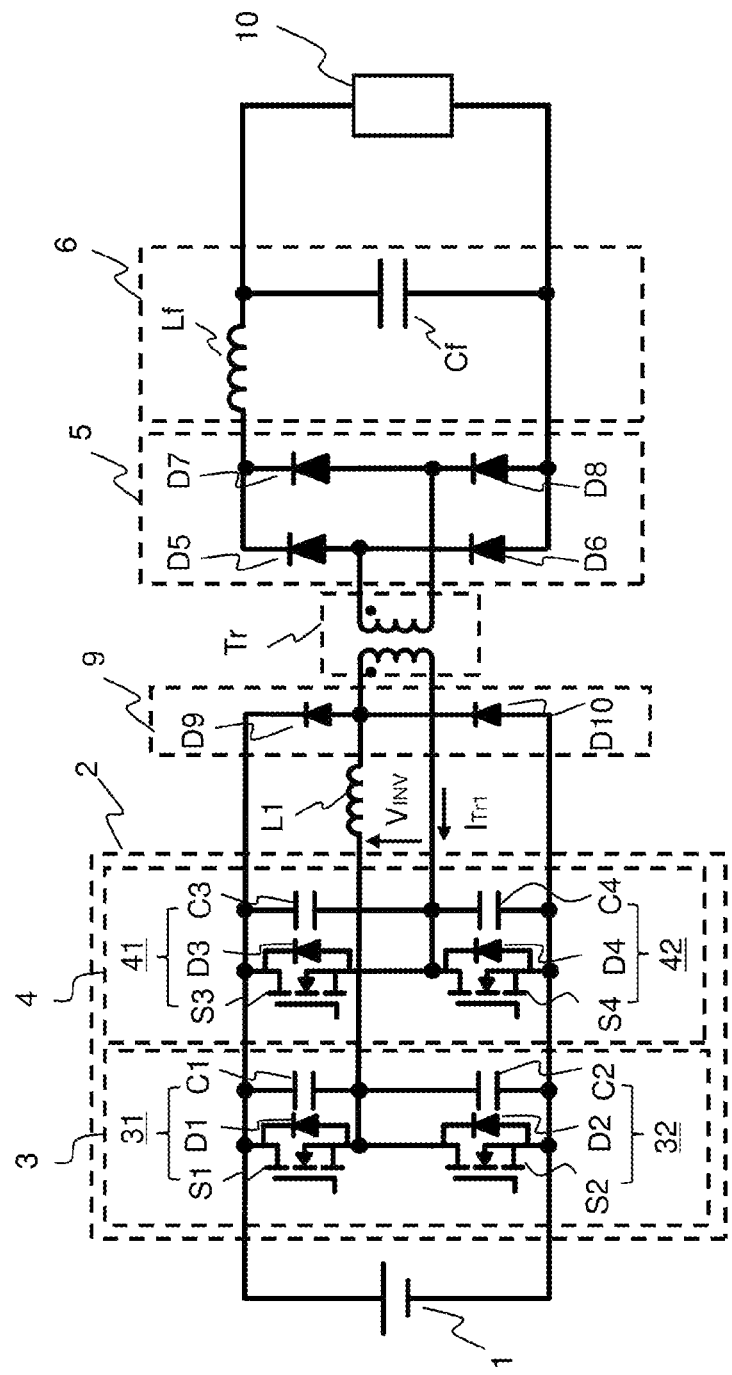
FIG. 13 is an exemplary circuit diagram showing the whole system including a power conversion device according to Embodiment 2 of the present invention.

FIG. 13 is an exemplary circuit diagram of a power conversion device according to Embodiment 2 of the present invention. In FIG. 13, as with Embodiment 1, the inverter 2 converts the DC voltage of the DC power source 1 into a high-frequency AC voltage to input the AC voltage to the transformer Tr; the rectifier circuit 5 rectifies a high-frequency AC voltage output from the transformer Tr; and the output smoothing filter 6 removes high-frequency components in the voltage output from the rectifier circuit 5, to supply a DC voltage to the load 10.

The inverter 2 is configured with the parallel connection of the first leg 3 and the second leg 4 each having the series-connected switching elements. The first leg 3 is configured with the series connection of the positive-side arm 31 having the switching element S1, the capacitor C1 connected in parallel with the switching element S1, and the freewheel diode D1 connected in anti-parallel with the switching element S1; and of the negative-side arm 32 having the switching element S2, the capacitor C2 connected in parallel with the switching element S2, and the freewheel diode D2 connected in anti-parallel with the switching element S2. The second leg 4 is configured with the series connection of the positive-side arm 41 having the switching element S3, the capacitor C3 connected in parallel with the switching element S3, and the freewheel diode D3 connected in anti-parallel with the switching element S3; and of the negative-side arm 42 having the switching element S4, the capacitor C4 connected in parallel with the switching element S4, and the freewheel diode D4 connected in anti-parallel with the switching element S4. The end of the positive-side arms 31, 41 and the end of the negative-side arm 32, 42 of the first leg 3 and the second leg 4 connected in parallel serve as the positive-side input terminal and the negative-side input terminal, respectively, and the output voltage of the DC power source 1 is applied across these terminals.

A point of the connection between the positive-side arm 31 and the negative-side arm 32 of the first leg 3 and a point of the connection between the positive-side arm 41 and the negative-side arm 42 of the second leg 4 are output terminals of the inverter 2, and the voltage $V_{INV}$ applied across these output terminals of the full-bridge inverter is supplied to the primary winding of the transformer Tr via the series-connected reactor L1.

The power conversion device is further provided with a circulation circuit 9 that has a diode D9 whose anode is connected with a point in the connection between the series-connected reactor L1 and the primary winding of the transformer Tr and whose cathode is connected with the positive-side input terminal and has a diode D10 whose cathode is connected with the point in the connection between the series-connected reactor L1 and the primary winding of the transformer Tr and whose anode is connected with the negative-side input terminal. The secondary winding of the transformer Tr is connected to the rectifier circuit 5 made up of diodes D5 to D8, and the output smoothing filter 6 and the load 10 are connected between the output terminals of the rectifier circuit. The switching operation and the variable dead time technique are the same as with Embodiment 1.

Also in Embodiment 2, the first leg 3 and the second leg 4 both operate with the soft switching utilizing the resonance in the dual-leg resonant mode in which the circulation period is eliminated by setting to zero the difference in phase between the first leg 3 and the second leg 4. The transmission power is controlled by increasing the power transmission period in the dual-leg resonant mode under high output power conditions and by the single-leg resonant mode using the conventional phase shift control under low output power conditions. Varying continuously the phase shift amount D-PS by the feedback control allows the dual-leg resonant mode and the single-leg resonant mode to be switched continuously. In addition to this, the circulation circuit 9 can suppress a surge voltage occurring in the rectifier circuit 5 due to the series-connected reactor L1, thus allowing for reducing the withstand voltage of the diodes D5 to D8 constituting the rectifier circuit 5.

Figure 14:
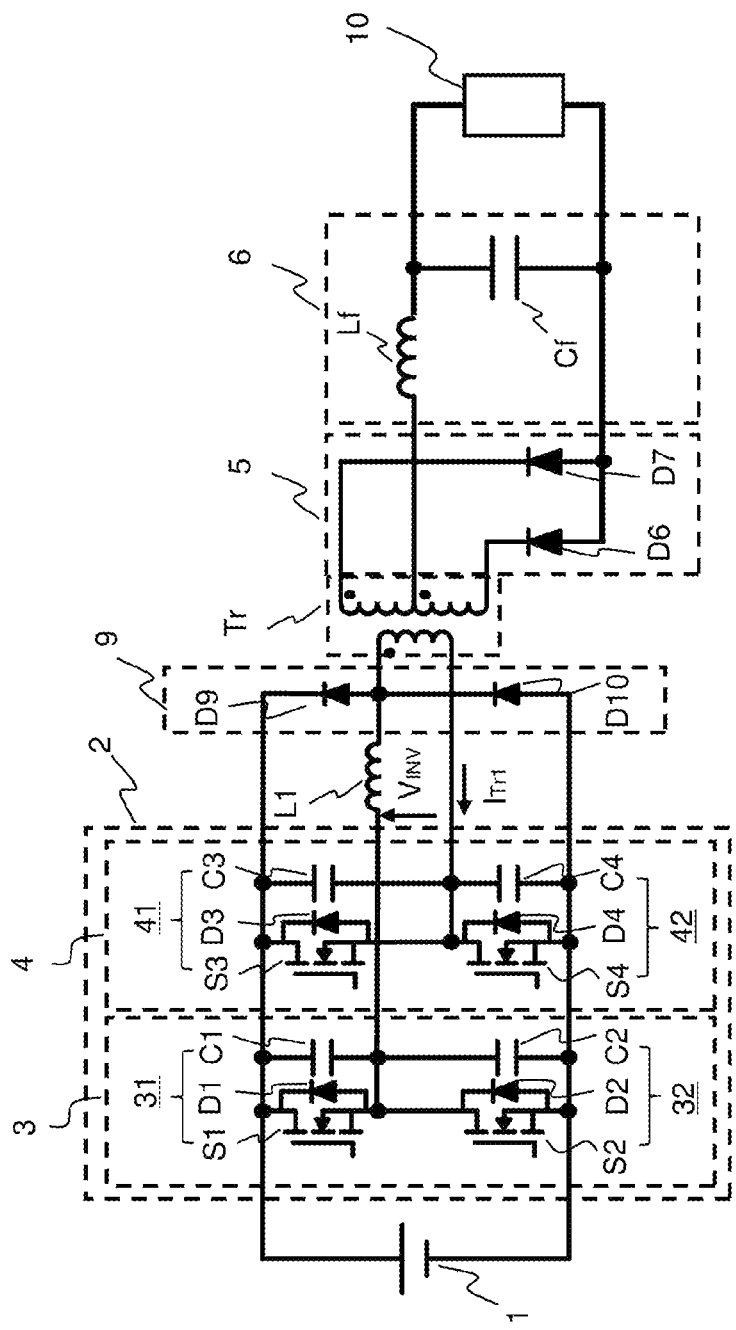
FIG. 14 is another exemplary circuit diagram showing the whole system including the power conversion device according to Embodiment 2 of the present invention.

In addition, the control method according to Embodiment 2 of the present invention can also be applied to a power conversion device that includes, as shown in FIG. 14, the transformer having the midpoint in the secondary winding and the rectifier circuit 5 having the center-tapped configuration.

Embodiment 3

A power conversion device according to Embodiment 3 has the same configuration as Embodiment 1 of FIG. 1. The inverter 2 converts the DC voltage of the DC power source 1 into a high-frequency AC voltage to output the AC voltage to the transformer Tr. The rectifier circuit 5 rectifies the high-frequency AC voltage output from the transformer Tr. The output smoothing filter 6 removes high frequency components in the voltage output from the rectifier circuit 5, to supply a DC power to the load 10.

Figure 15:
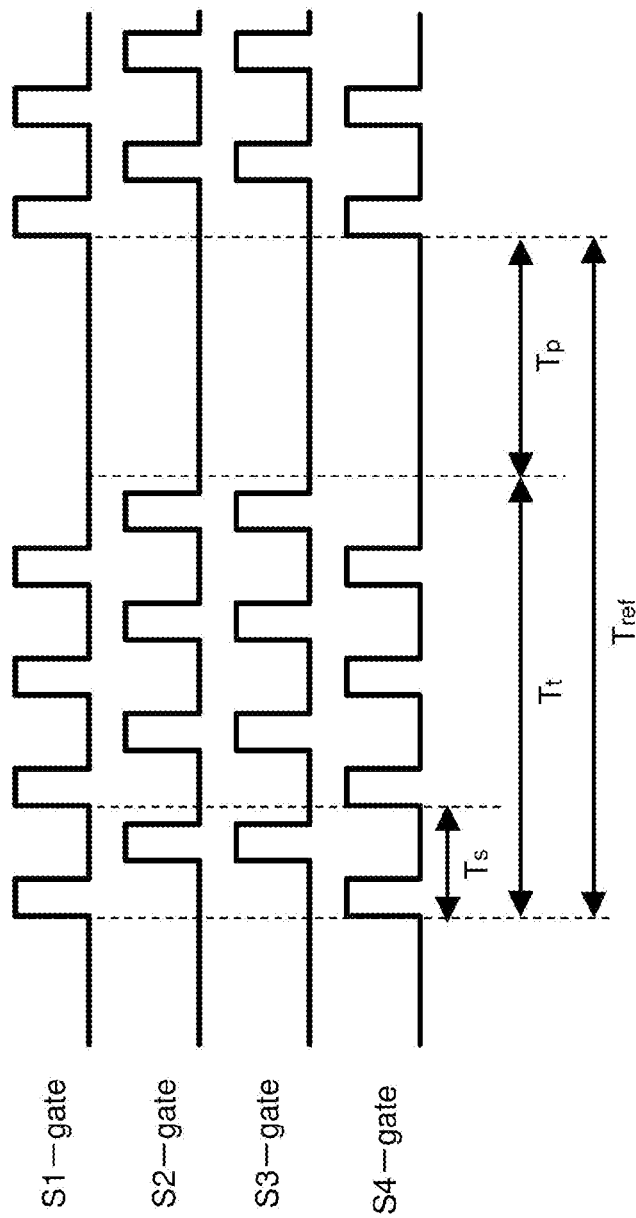
FIG. 15 shows time charts for explaining an example of the operation of a power conversion device according to Embodiments 3 and 4 of the present invention.

While in Embodiment 1, the operation mode of the inverter 2 is determined to be the dual-leg resonant mode when the calculated phase shift amount D-PS is equal to or smaller than the mode determining threshold Mode-ref, and to be the single-leg resonant mode when the calculated phase shift amount D-PS is larger than the mode determining threshold Mode-ref in Embodiment 3, a mode determining threshold Mode-ref2 (a second threshold) that is even larger than the mode determining threshold Mode-ref (a first threshold) is set in addition thereto. When the calculated phase shift amount is larger than the mode determining threshold Mode-ref and is equal to or smaller than the mode determining threshold Mode-ref2, the inverter is operated in the single-leg resonant mode. Further, a power transmission period Tt during which the inverter 2 operates in the dual-leg resonant mode and a power non-transmitting period Tp during which the inverter 2 pauses are set, and when the calculated phase shift amount D-PS is larger than the mode determining threshold Mode-ref2, the inverter is controlled using these periods as shown in FIG. 15. With this control, the inverter operates in the dual-leg resonant mode when the transmission power is relatively small, thereby bringing about an advantage of improving the power conversion efficiency under a small transmission power condition, i.e., a light load condition in which the soft switching in the single-leg resonant mode is inoperable.

The operation when the phase shift amount D-PS is larger than the mode determining threshold Mode-ref2 is specifically described below. The inverter 2 is set to supply power in the dual-leg resonant-mode during the power transmission period Tt and to pause during the power non-transmission period Tp not to transmit power. A pair of the power transmission period Tt and the power non-transmission period Tp is repeated. This operation mode is referred to as "dual-leg resonant and non-transmission mode". Letting the pair of the power supplies in the dual-leg resonant mode by turn-on of the switching elements S1, S4 and by turn-on of the switching elements S2, S3 be counted as one time, each switching element is paused in the power non-transmission period Tp after the power is supplied $N_2$ times in the power transmission period Tt The effective on-duty D-Tr (maximum of 0.5) of the voltage applied to the transformer is expressed by the following equation (8):

$$D - Tr = \frac{\frac{T_{on}}{2} - T_d}{\frac{T_s}{2}} \times \frac{T_t}{T_t + T_p}. \tag{8}$$

In addition, a reference cycle $T_{ref}$ is set and the reference cycle $T_{ref}$ may be divided into the power transmission period Tt and the power non-transmission period Tp. In this case, the effective on-duty D-Tr (maximum of 0.5) of the voltage applied to the transformer is expressed by the following equation (9):

$$D - Tr = \frac{\frac{T_{on}}{2} - T_d}{\frac{T_s}{2}} \times \frac{N_2}{N_1} \text{ and} \tag{9}$$

$$T_{ref} = N_1 T_s. \tag{10}$$

In the equation (9), $N_2$ is the number of power supplies to the load in the reference cycle $T_{ref}$ and is counted as one time the pair of power supplies by turn-on of the switching elements S1, S4 and by turn-on of the switching elements S2, S3. In terms of suppressing bias magnetization of the transformer, $N_2$ is preferably set to be positive integer. Note that $N_1$ is the ratio of the switching cycle $T_s$ to the reference cycle $T_{ref}$ as shown in the equation (10) and has a value of one or more. In this way, the voltage or the current output to the load is controlled by the number of power supplies to the load in the reference cycle $T_{ref}$.

As described above, when the phase shift amount D-PS is larger than the mode determining threshold Mode-ref2, the inverter 2 is controlled not in the single-leg resonant mode but in the dual-leg resonant and non-transmission mode, that is, the power transmission period Tt in the dual-leg resonant mode and the power non-transmission period Tp, during which all switching elements are turned off and the inverter is paused not to transmit power, are repeated one after another, and an averaged power may thereby be controlled using the ratio between the power transmission period Tt and the power non-transmission period Tp. Whether to operate the inverter in the dual-leg resonant or the non-transmission mode is determined not from the magnitude of calculated phase shift amount but may be determined simply from whether the magnitude itself of the input voltage value $V_{dc}$ or the input current value $I_{dc}$, or the output voltage value $V_{out}$ or the output current value $I_{out}$ is larger than corresponding one of respective thresholds for them. In this way, also in Embodiment 3, the operation mode can be determined on the basis of at least one value of the input voltage, the input current, the output voltage, and the output current, as described in Embodiment 1.

Embodiment 4

In Embodiment 4, the inverter is controlled only in the dual-leg resonant mode without using the single-leg resonant mode. The averaged power is controlled, as shown in FIG. 15, using the ratio between the power transmission period Tt and the power non-transmission period Tp without making the mode determination. In this control, the power non-transmission period Tp becomes zero at transmitting the maximum power. For example, with $N_2$ being a positive integer in the equation (9), setting $N_1$ to be a positive integer multiple of $N_2$ in determining the reference cycle $T_{ref}$ brings about no power non-transmission period at supplying the maximum power, thus being able to maximize the utilization factor of the transformer. Thus, the power conversion device according to Embodiment 4 controls the output power by means of the ratio between the power transmission period Tt during which the power is transmitted by operating the inverter in the dual-leg resonant mode without using the single-leg resonant mode and the power non-transmission period Tp during which no power is transmitted. This eliminates the need for the dead time to be adjusted for the operation mode switched between the single-leg resonant mode and the dual-leg resonant mode, thereby allowing the load of the controller 100 to be reduced while transmitting power with high efficiency.

It should be noted that each embodiment of the present invention may be combined or appropriately modified and omitted within the scope and the spirit of the invention.

REFERENCE NUMERALS

1: DC power source;
2: inverter;
3: first leg;
4: second leg;
5: rectifier circuit;
31, 41: positive-side arm;
32, 42: negative-side arm;
100: controller;
Tr: transformer;
L1: series-connected reactor;
C1, C2, C3, C4: capacitor;
D1, D2, D3, D4: freewheel diode;
S1, S2, S3, S4: switching element;
Tt: power transmission period; and
Tp: power non-transmission period.

The invention claimed is:

1. A power conversion device comprising:
a full-bridge inverter configured with a parallel connection of two legs: a first leg and a second leg, each having two switching elements constituting respective arms connected in series, each arm having a capacitor connected in parallel with the switching element and a diode connected in anti-parallel with the switching element;
a transformer, a primary side of the transformer being connected to the full-bridge inverter;
a rectifier circuit connected to a secondary side of the transformer; and
a controller configured to control the switching elements constituting each arm of the first leg and the second leg, wherein one end of the parallel connected legs is connected to a positive terminal of a DC power source and the other end is connected to a negative terminal of the DC power source, and a point in the series connection between the arms of the first leg and a point in the series connection between the arms of the second leg are connected to the primary side of the transformer, to supply an AC voltage to the primary side of the transformer, and
wherein the controller controls the inverter to operate in a dual-leg resonant mode in which a positive-side switching element constituting a positive-side arm of the first leg and a negative-side switching element constituting a negative-side arm of the second leg are turned on and off at the same time by performing a soft switching operation, and a negative-side switching element constituting a negative-side arm of the first leg and a positive-side switching element constituting a positive-side arm of the second leg are turned on and off at the same time by performing the soft switching operation, or to operate in a single-leg resonant mode in which the positive-side switching element of the first leg and the negative-side switching element of the second leg are turned on and off shifted in time by a phase shift amount, and the negative-side switching element of the first leg and the positive-side switching element of the second leg are turned on and off shifted in time by the phase shift amount,
wherein the controller:
controls the switching elements to be in the single-leg resonant mode when a value of a current and/or a value of a voltage input from the DC power source, or a value of a current and/or a value of a voltage output from the rectifier circuit is smaller than a threshold value, and
controls the switching elements to be in the dual-leg resonant mode when the value of the current and/or the value of the voltage input from the DC power source, or the value of the current and/or the value of the voltage output from the rectifier circuit is equal to or larger than the threshold value.

2. The power conversion device of claim 1, wherein a reactor is connected in series with the transformer on the primary side of the transformer.

3. The power conversion device of claim 1, wherein the controller calculates the phase shift amount using a value of a current and/or a value of a voltage input from the DC power source, or a value of a current and/or a value of a voltage output from the rectifier circuit, controls each switching element in the dual-leg resonant mode with the phase shift amount being zero when the calculated phase shift amount is equal to or smaller than a predetermined first threshold, and controls each switching element in the single-leg resonant mode when the calculated phase shift amount is larger than the predetermined first threshold.

4. The power conversion device of claim 3, wherein the controller sets a second threshold larger than the first threshold, and controls, when the calculated phase shift amount is larger than the first threshold and equal to or smaller than the second threshold, each switching element in the single-leg resonant mode, and controls, when the calculated phase shift amount is larger than the second threshold, the switching elements to repeat a power transmission period during which each switching element is turned on and off in the dual-leg resonant mode and a power non-transmission period during which all switching elements are turned off.

5. The power conversion device of claim 1, wherein a dead time that is a time interval between a turn-off timing of the positive-side switching element and the following turn-on timing of the negative-side switching element of one of the legs and a time interval between a turn-off timing of the negative-side switching element and the following turn-on timing of the positive-side switching element of the other leg is different in the dual-leg resonant mode and in the single-leg resonant mode.

6. The power conversion device of claim 5, wherein the dead time for the first leg and the dead time for the second leg are different from each other in the single-leg resonant mode.

7. The power conversion device of claim 6, wherein the controller calculates the dead time using a value of a current and/or a value of a voltage input from the DC power source, or a value of a current and/or a value of a voltage output from the rectifier circuit.

8. The power conversion device of claim 5, wherein the controller calculates the dead time using a value of a current and/or a value of a voltage input from the DC power source, or a value of a current and/or a value of a voltage output from the rectifier circuit.

9. A power conversion device of claim 1, wherein in the dual-leg resonant mode, the controller controls the switching elements to turn-on after voltages across the switching elements fall to 0.

10. A power conversion device, comprising:
a full-bridge inverter configured with a parallel connection of two legs: a first leg and a second leg, each having two switching elements constituting respective arms connected in series, each arm having a capacitor connected in parallel with the switching element and a diode connected in anti-parallel with the switching element;
a transformer, a primary side of the transformer being connected to the full-bridge inverter;
a rectifier circuit connected to a secondary side of the transformer; and
a controller configured to control the switching elements constituting each arm of the first leg and the second leg,
wherein one end of the parallel connected legs is connected to a positive terminal of a DC power source and the other end is connected to a negative terminal of the DC power source, and a point in the series connection between the arms of the first leg and a point in the series connection between the arms of the second leg are connected to a primary side of the transformer, to supply an AC voltage to the primary side of the transformer,
wherein the controller controls the inverter to operate in a dual-leg resonant mode in which a positive-side switching element constituting the positive-side arm of the first leg and the negative-side switching element constituting the negative-side arm of the second leg are turned on and off at the same time and the negative-side switching element constituting the negative-side arm of the first leg and the positive-side switching element constituting the positive-side arm of the second leg are turned on and off at the same time, and to repeat a power transmission period during which each switching element is controlled to turn on and off with a determined switching cycle in the dual-leg resonant mode and a power non-transmitting period during which all switching elements are turned off without being controlled to turn on and off, and thereby controls output power of the inverter by means of a ratio between the power transmission period and the power non-transmission period, and
wherein a reference cycle of repeating the power transmission period and the power non-transmission period is set to be an integer multiple of the switching cycle and a pair of power supplies by one turn-on of the positive-side switching element constituting the positive-side arm of the first leg and the negative-side switching element constituting the negative-side arm of the second leg and by subsequent one turn-on of the negative-side switching element constituting the negative-side arm of the first leg and the positive-side switching element constituting the positive-side arm of the second leg is defined as one power supply, and the output power to a load is controlled by the number of power supplies included in the power transmission period.

* * * * *